US005903832A

United States Patent [19]
Seppanen et al.

[11] Patent Number: 5,903,832
[45] Date of Patent: May 11, 1999

[54] MOBILE TERMINAL HAVING ENHANCED SYSTEM SELECTION CAPABILITY

[75] Inventors: Jorma Seppanen, Oulu; Juha Vaihoja, Tupos; Mikko Lietsalmi; Jaakko Vanttila, both of Oulu, all of Finland

[73] Assignee: Nokia Mobile Phones Llimited, Salo, Finland

[21] Appl. No.: 08/576,260

[22] Filed: Dec. 21, 1995

[51] Int. Cl.$^6$ .................................................. A63B 67/00
[52] U.S. Cl. ........................ 455/414; 455/412; 455/432; 455/435; 455/551
[58] Field of Search ................................... 455/412, 414, 455/421, 432, 433, 434, 435, 436, 437, 525, 186.1, 551, 552

[56] References Cited

U.S. PATENT DOCUMENTS

| | | | |
|---|---|---|---|
| 5,046,082 | 9/1991 | Zicker et al. | 379/59 |
| 5,276,729 | 1/1994 | Higuchi et al. | 379/58 |
| 5,371,782 | 12/1994 | Casey, III et al. | 379/61 |
| 5,504,803 | 4/1996 | Yamada et al. | 379/59 |
| 5,586,338 | 12/1996 | Lynch et al. | 455/434 |
| 5,590,397 | 12/1996 | Kojima | 455/414 |
| 5,613,204 | 3/1997 | Haberman et al. | 455/432 |
| 5,613,213 | 3/1997 | Naddell et al. | 455/186.1 |

FOREIGN PATENT DOCUMENTS

0 630 167 A2  12/1994  European Pat. Off. .

OTHER PUBLICATIONS

Over–the–Air Activation Teleservice (OATS), Dec. 15, 1995, pp. 329–368.
"Proposed new SMS services", SMS.JEM/94.03.21, Mar. 22, 1994, Seppo Alanara.
"Proposed Feature/Service Code List", TR45.3.6/94.04.06.16, Digital Cellular Systems, Mark Wells, Seppo Alanara, Apr. 5–7, 1994.
IS–136.1 Rev O, May 17, 1995, Section 7, pp. 286–307.
"TDMA Forum, Implementation Guide: Short Message Terminals Compliant With IS–136 and IS–137" (Ed. D. Holmes, vers. 7.0, Apr. 20, 1995).
"TDMA Forum, Implementation Guide: Non–Public Mode Operation and Selection in IS–136 Compliant Mobile Stations", Version 2.0, Mar. 9, 1995.

Primary Examiner—Wellington Chin
Assistant Examiner—Keith Ferguson
Attorney, Agent, or Firm—Perman & Green, LLP

[57] ABSTRACT

A mobile station (10) maintains a single, prioritized list of all available networks (i.e., all public, residential, and private networks). Access to the various networks is then based on the user's needs. A first type of access is an automatic access, that requires little or no user involvement. A second type of access is to a user-specified network. A third type of access is to a user-specified service (e.g., data, fax, e-mail, etc.) that is supported by at least one of the networks. The mobile station can search for additional networks, and can also search for additional networks that support only a specified type of service, or for a network that supports a service not supported by networks that are already in the list. All of the networks can be searched at once so that the user can readily make a selection from the single, prioritized network list. The network priorities are user programmable by moving network names up and down in the list using a mobile station user interface, such as the mobile station's keypad. The higher the network name is placed in the list, the higher is the priority of the network.

27 Claims, 10 Drawing Sheets

```
              SELECT
              ┌─────────┐       ▼                ▼
              │      1  │     ┌─────────┐      ┌─────────┐
              │ PRIVATE │     │      2  │      │      3  │
              │ McCAW   │     │ PRIVATE │      │SEARCH FOR│
              │ SEATTLE │     │MICROSOFT│      │ MORE    │
              │        0│     │ Ltd.   0│      │ NETWORKS 0│
              │OK  QUIT │     │OK  QUIT │      │OK  QUIT │
              └─────────┘     └─────────┘      └─────────┘
               FIG. 15A        FIG. 15B         FIG. 15C
```

FIG. 15A — SELECT / PRIVATE McCAW SEATTLE / OK QUIT

FIG. 15B — PRIVATE MICROSOFT Ltd. / OK QUIT

FIG. 15C — SEARCH FOR MORE NETWORKS / OK QUIT

FIG. 16A — ▶DATA / SMS / MORE... / SELECT QUIT

FIG. 16B — DATA / SMS / ▶MORE... / SELECT QUIT

FIG. 16C — SEARCHING...

FIG. 16D — SELECT / DATA / SMS / ▶FAX / SELECT QUIT

FIG. 17A — OK / SEARCH FOR MORE NETWORKS / OK QUIT

FIG. 17B — SEARCHING...

FIG. 17C — PRIVATE AT & T PORTLAND / OK INFO

FIG. 18A — NETWORK SETTINGS / SELECT QUIT

FIG. 18B — SELECT / PUBLIC NETWORKS HOMETYPE A / SELECT QUIT

FIG. 18C — PRIVATE NETWORKS / SELECT QUIT

FIG. 18D — RESET TO DEFAULT / SELECT QUIT

FIG. 19A

```
AB              1
! PUBLIC
  NETWORKS
! BOTH A & B   0
SELECT     QUIT
```

FIG. 19B
SELECT
```
AB              1
! HOME AREA
 ►BOTH A & B
! HOMETYPE A   0
OK         QUIT
```

FIG. 19C
▼
```
AB              2
! BOTH A & B
 ►HOMETYPE A
! NON-HOME B   0
OK         QUIT
```

FIG. 19D
▼
```
AB              3
! HOMETYPE A
 ►NON-HOME B
! HOME AREA    0
OK         QUIT
```

FIG. 19E
▼
```
AB              4
! NON-HOME B
 ►HOME AREA
! BOTH A & B   0
OK         QUIT
```

FIG. 19F
SELECT
```
AB              1
! PUBLIC
  NETWORKS
! HOME AREA    0
SELECT     QUIT
```

FIG. 20A

```
AB              2
! PRIVATE
  NETWORKS
!              0
SELECT     QUIT
```

FIG. 20B
SELECT
```
                1
! PRIVATE
  SYSTEM 1
!              0
MOVE       QUIT
```

FIG. 20C
▼
```
                2
! PUBLIC
  SYSTEMS
!              0
MOVE       QUIT
```

FIG. 20D
▼
```
                3
! RESIDENT
 ►MARRIOTT
  WEST        0
MOVE       QUIT
```

FIG. 20E
▼
```
                4
! FOLLOWING
  OUT OF USE
! ******      0
MOVE       QUIT
```

FIG. 20F
▼
```
                5
! PRIVATE
  MICROSOFT
  Ltd.        0
MOVE       QUIT
```

FIG. 21A

```
                2
! PRIVATE
  NETWORKS
!              0
SELECT     QUIT
```

FIG. 21B
SELECT
```
                1
! PRIVATE
  SYSTEM 1
!              0
MOVE       QUIT
```

FIG. 21C
▼
```
                2
! PUBLIC
  SYSTEMS
!              0
MOVE       QUIT
```

FIG. 21D
MOVE
```
                2
! PRIVATE
 ►PUBLIC
  RESIDENT .  0
DROP       QUIT
```

FIG. 21E
▼
```
                3
! RESIDENT
 ►PUBLIC
! ******      0
DROP       QUIT
```

FIG. 21F
▼
DROP
```
                4
! ******
 ►PUBLIC
  PRIVATE     0
DROP       QUIT
```

FIG. 21G
```
                4
! PUBLIC
  SYSTEMS
!              0
MOVE       QUIT
```

MOBILE TERMINAL HAVING ENHANCED SYSTEM SELECTION CAPABILITY

FIELD OF THE INVENTION

This invention relates generally to radiotelephones and, in particular, to mobile terminals such as those capable of operation with a cellular network.

BACKGROUND OF THE INVENTION

Communications between two cellular radiotelephone (also referred to herein as a mobile terminal and a mobile station) users is established using cellular systems. By example, in the Time Division, Multiple Access (TDMA) system known as IS-136 (IS-136.1, Rev. 0, May 17,1995) various network systems are classified into three groups: public, private, and residential networks. Private and residential networks may also be referred to as non-public networks. Typically, there are two public cellular systems in one geographical area. In addition, there may be one or more non-public cellular systems available to users within the same geographical area. Also, service providers operating in other bands, such as the 1900 MHz band, may also be available.

The two public cellular systems within one geographical area are conventionally referred to as the A-system and the B-system. For example, in both the New York and Los Angeles metropolitan areas there are two public cellular systems. Each of these systems has its own unique identity, referred to as the SID (System Identification).

Generally, the cellular radiotelephone can operate at any given time in one of the two available public systems, and a display of the radiotelephone will typically have indicators (i.e., A and B icons) for indicating to the user which system is currently being used.

One of the public systems is always referred to as the "home system" of the radiotelephone, or more specifically as the home system of the radiotelephone's Number Assignment Module (NAM). Whether the home system is A-type or B-type depends on the parameters of the currently selected NAM.

One purpose of non-public systems is to provide specialized telecommunications services to radiotelephone users. The primary non-public system types include Wireless Business Systems, Limited Service Areas, and Residential Cellular Telephones.

In the Wireless Business System (WBS) application, connections for a closed group of users are typically switched through an existing PBX or through the public switched telephone network (PSTN). This type of system provides capabilities for offering specific features that can be highly integrated with other telecommunications services used by the group, with the goal of providing all of the capabilities of a desk telephone. Examples of these services include: voice mail integrated into an existing wired PBX; centralized speed dial lists; and simplified private network access.

In the Limited Service Area (LSA) application, a closed group of users may receive special billing considerations and custom features and services while within the coverage range of the private or semi-private system. Public subscribers not belonging to the closed group would receive service at standard billing rates. An LSA may be deployed at shopping malls, airports, sports facilities, hotels, etc. Full-time staff at such a facility may subscribe to the LSA service, while customers and itinerant visitors receive standard public wireless service over the same network.

The Residential Cellular Telephone (RCT) application is intended for use within a residence, and functions as an enhanced wireless telephone set. The RCT application is intended to provide users with a single handset which can be used as a cordless telephone when operated in conjunction with a home or neighborhood base station within a residential or office environment. The RCT application is also intended to provide a standard cellular mobile station when operating within the cellular environment, or as part of a Wireless Business System (WBS). When the handset is used as a conventional cordless telephone, the associated home or neighborhood base station communicates with the cellular network to assure that a user's calls are automatically forwarded to the user's landline telephone number.

In a document entitled "TDMA Forum, Implementation Guide: Non-Public Mode Operation and Selection in IS-136 Compliant Mobile Stations", Version 2.0, Mar. 9, 1995, a number of system operators have described non-public mode and selection requirements for mobile stations compliant with TIA Interim Standards IS-136 and IS-137. The document is said not to mandate any specific implementation, but instead to promote a similar level of services for all mobile station users.

Figure 1:
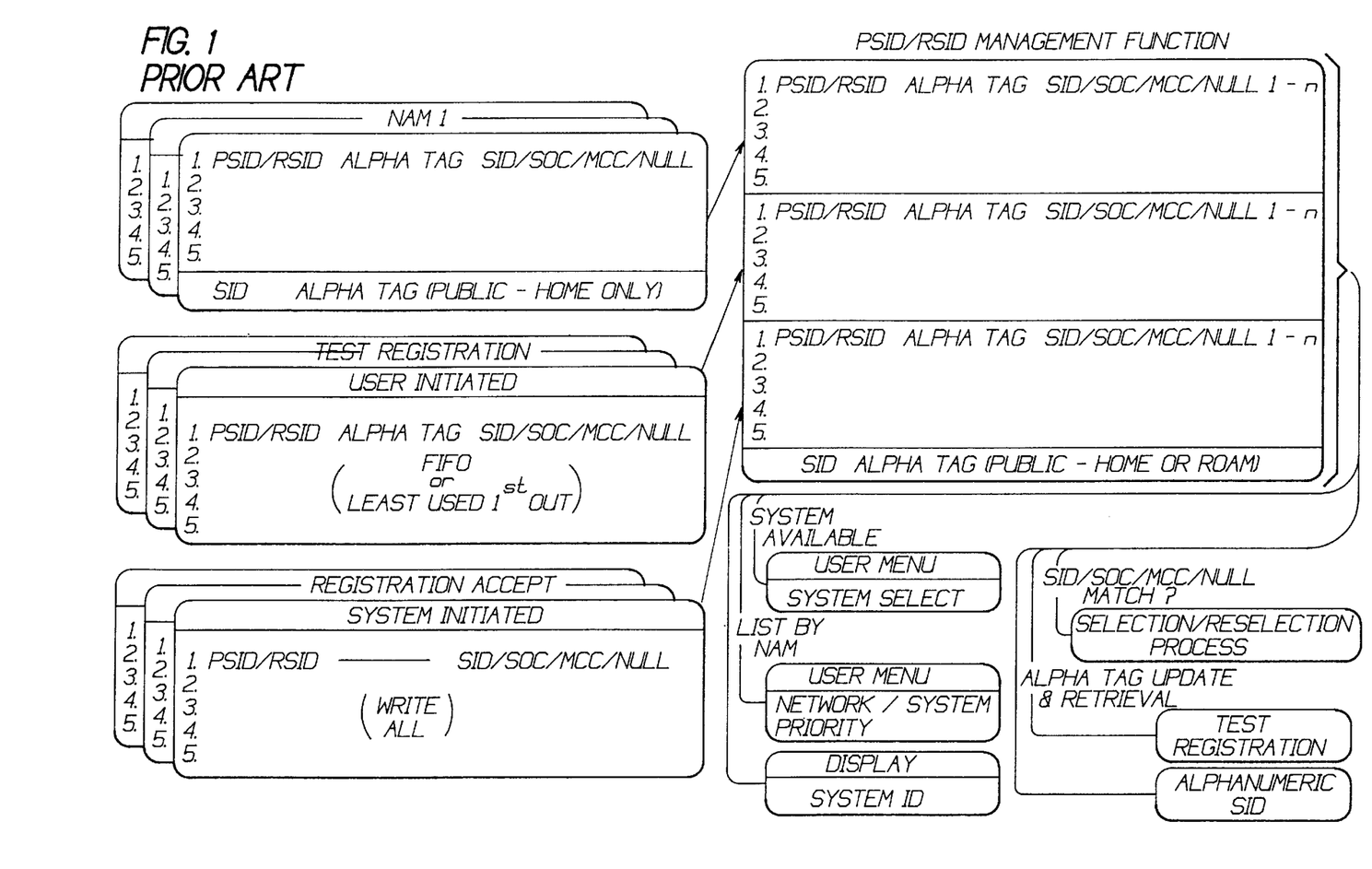
FIG. 1 illustrates a prior art mobile station reference model for non-public mode operation.

FIG. 1 is based on FIG. 1.3-1 of the above-referenced TDMA Forum document, and illustrates a mobile station reference model for non-public mode operation. More particularly, FIG. 1 illustrates the various elements required to support the loading and management of PSIDs/RSIDs in an IS-136 compatible mobile station. To facilitate the discussion, the following conventions are used.

PSID is the numeric value of a Private System ID. A PSID is always be associated with the appropriate System Identification Code (SID), System Operator Code (SOC), Mobile Country Code (MCC), or International status (Null), according to Section 8.3.4 of IS-136, during the process of storage or verification.

RSID is the numeric value of a Residential System ID. An RSID should always be associated with the appropriate SOC, MCC, or International status (Null), according to Section 8.3.5 of IS-136, during the process of storage or verification.

Alpha Tag is an alphanumeric designator associated with a PSID/RSID. This designator may be used when a user is alerted or is presented a choice regarding a specific PSID/RSID. The numeric PSID/RSID values are said to be used solely for the Selection/Reselection processes, and should not be presented to the user. The alphanumeric designator (i.e., the Alpha Tag) is derived from either a Test Registration Alphanumeric PSID/RSID, from an alphanumeric tag entered with the PSID/RSID during NAM programming, or from a default Alpha Tag used if neither of the previous two sources are available.

In a similar manner, the term Alpha Tag is used to refer to the alphanumeric designator associated with a given SID, whether the designation is derived from the Alphanumeric SID available from the system or is derived from an Alpha Tag entered during NAM programming. The numeric SID is not presented to the user, but rather, the Alpha Tag associated with the SID.

The MS Reference Model for Non-Public Mode Operation of FIG. 1 is divided into three major functions: (1) PSID/RSID acquisition, (2) user review and selection of PSIDs/RSIDs, and (3) the selection and reselection processes. These three elements are said to be administered by a common PSID/RSID Management Function. As presented, FIG. 1 is intended to aid in describing the storage, display, prioritization, and selection of PSIDs/RSIDs.

The management of the storing, displaying, selecting, and prioritizing PSIDs/RSIDs is facilitated by constructing a list within a PSID/RSID logical management block. Each list is NAM specific and is dynamic with respect to the fact that it is reconstructed or updated each time the contents of a corresponding NAM, Test Registration, or Registration Accept PSID/RSID list changes. The "common" PSID/RSID list is called upon to support the selection/reselection processes; for two user menu functions, System Select and Network Priority; and for a System ID display function. As previously described, the numeric PSIDs/RSIDs residing in this list are used for the selection/reselection process, while the Alpha Tags linked to these PSIDs/RSIDs are used for all user interactions.

The storage and purpose of each PSID/RSID acquisition method is unique. NAM programmed PSIDs/RSIDs are intended to be entered by a service technician and will be, in general, permanent, although their Alpha Tags may be updated. The Test Registration method is invoked by the user and is primarily used for acquiring new PSIDs/RSIDs. Each PSID/RSID acquired by a Test Registration is stored individually and replaces a previously stored PSID/RSID within the Test Registration storage area if the storage area is full. Finally, the Registration Accept method is system initiated and can automatically load a PSID/RSID set without any user interaction. For this method, a new list overwrites any previously stored PSIDs/RSIDs within the Registration Accept storage area. As FIG. 1 depicts, each NAM supporting non-public mode operation will have one of each of these three storage areas.

As can be appreciated, as the complexity of cellular telephone networks increases, and as user's are given more options for communicating through various systems, including public and non-public systems, it has become important to provide a simple and efficient user interface enabling a user to manage, prioritize, and select between available systems.

OBJECTS OF THE INVENTION

It is thus a first object of this invention to provide an efficient and simple technique for enabling a user of a mobile terminal or station to manage, prioritize, and select between available systems.

It is a second object of this invention to provide a mobile terminal or station to having automatic network selection capability, temporary network selection capability by network name or network capability (e.g., data, fax, e-mail, etc.), and a capability for setting parameters and priorities of networks.

SUMMARY OF THE INVENTION

The foregoing and other problems are overcome and the objects of the invention are realized by methods and apparatus in accordance with embodiments of this invention.

In accordance with an aspect of this invention a mobile station maintains a single, prioritized list of all available networks (i.e., all public, residential, and private networks). Access to the various networks is based on the user's needs. A first type of access is an automatic access, that requires little or no user involvement. A second type of access is to a user-specified network. A third type of access is to a user-specified service (e.g., data, fax, e-mail, etc.) that is supported by at least one of the networks. The mobile station can search for additional networks, and can also search for additional networks that support only a specified type of service, or for a network or networks that support a type of service not supported by networks that are already in the list. All of the networks can be searched at once so that the user can readily make a selection from the single, prioritized network list.

In the first type of access the mobile station selects any available network, wherein the home area network has the highest priority, a second highest priority is reserved for home-type networks, and a third highest priority is reserved for non-home type networks. Any private networks that may be available are not selected unless programmed to do so. The mobile station may indicate the presence of private networks by displaying a notification and/or outputting an audible signal. If an allowed residential network is available, it is selected automatically. A default network priority order is residential, private, and public.

In accordance with a further aspect of this invention the network priority is programmed by moving network names up and down in the list using a mobile station user interface, such as the mobile station's keypad and display. The higher the network name is placed in the list, the higher is the priority of the network. Also, generic network names (e.g., HOME AREA, HOME-TYPE, NON-HOME PRIVATE 1, PRIVATE 2, RESIDENT 1 and RESIDENT 2) can be used. The prioritized list is then used in the automatic selection of the networks. The higher the priority the more likely it is that the network is selected for use. If a given network is set so as to be not used, the network is not selected except in an emergency call situation.

The second type of access (i.e., locate a specific network) is especially beneficial since some networks may have lower rates that the others. In this case the user is presented with the list of the all available networks, including public, private and residential networks. If the user selects a specific network name from the list, the user can then obtain further information related to that network by pressing an appropriate key/soft key. The network can also be selected for registration through the use of a key/soft key.

The third type of access (i.e., locate a specific service) is beneficial when the user is required to select a specific service. By example, only some available networks may offer data services, or data services having a desired bit transfer rate. The solution in accordance with this invention is that the end user is presented a list of all of the available services in all available networks. In this case the user is enabled to select a specific service type from a list of service types, and all available networks that support the selected service type are then displayed. Any one of the displayed supporting networks can then be selected. When a particular type of service is selected, it is also within the scope of this invention to search for additional networks, and to display to the user only those newly found networks that support the selected type of service.

BRIEF DESCRIPTION OF THE DRAWINGS

The above set forth and other features of the invention are made more apparent in the ensuing Detailed Description of the Invention when read in conjunction with the attached Drawings, wherein:

FIGS. 3A–23D illustrate various menu and other displays that are presented to the user during the use of the teaching of this invention.

DETAILED DESCRIPTION OF THE INVENTION

Figure 2A:
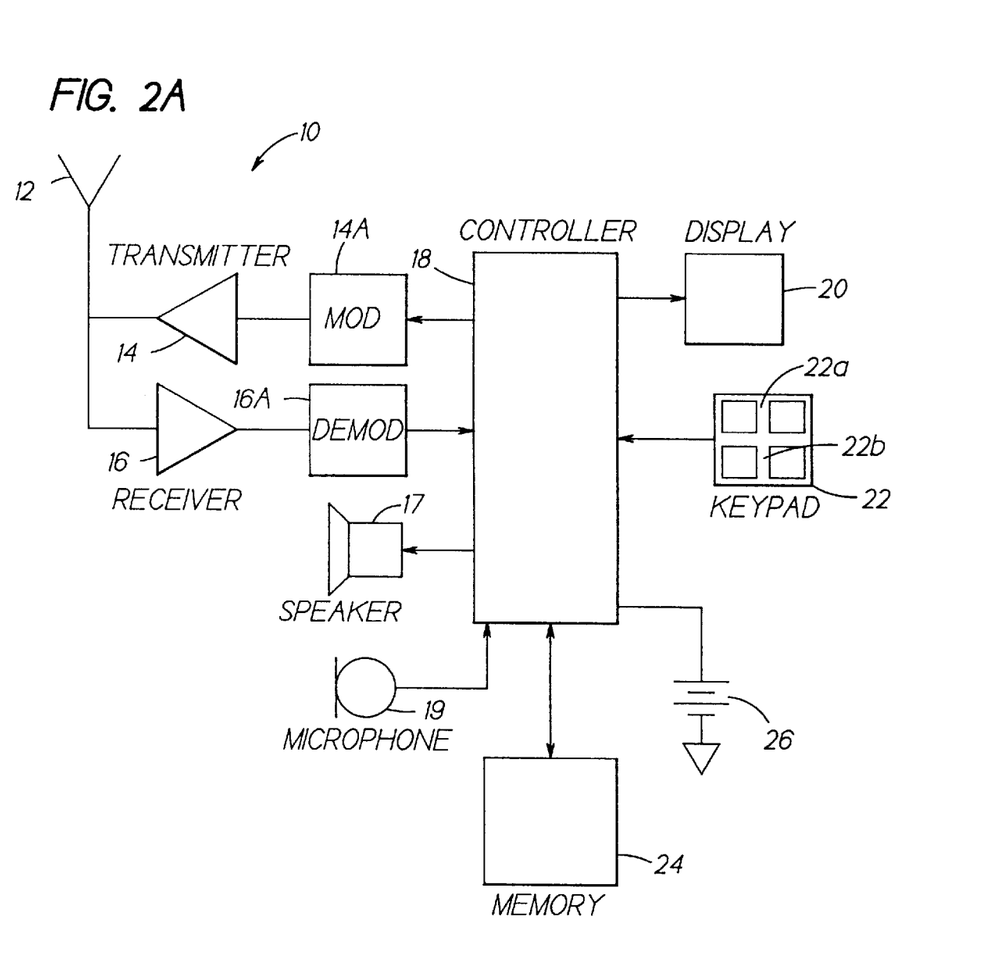
FIG. 2A is a block diagram of a mobile station that is constructed and operated in accordance with this invention.
Figure 2B:
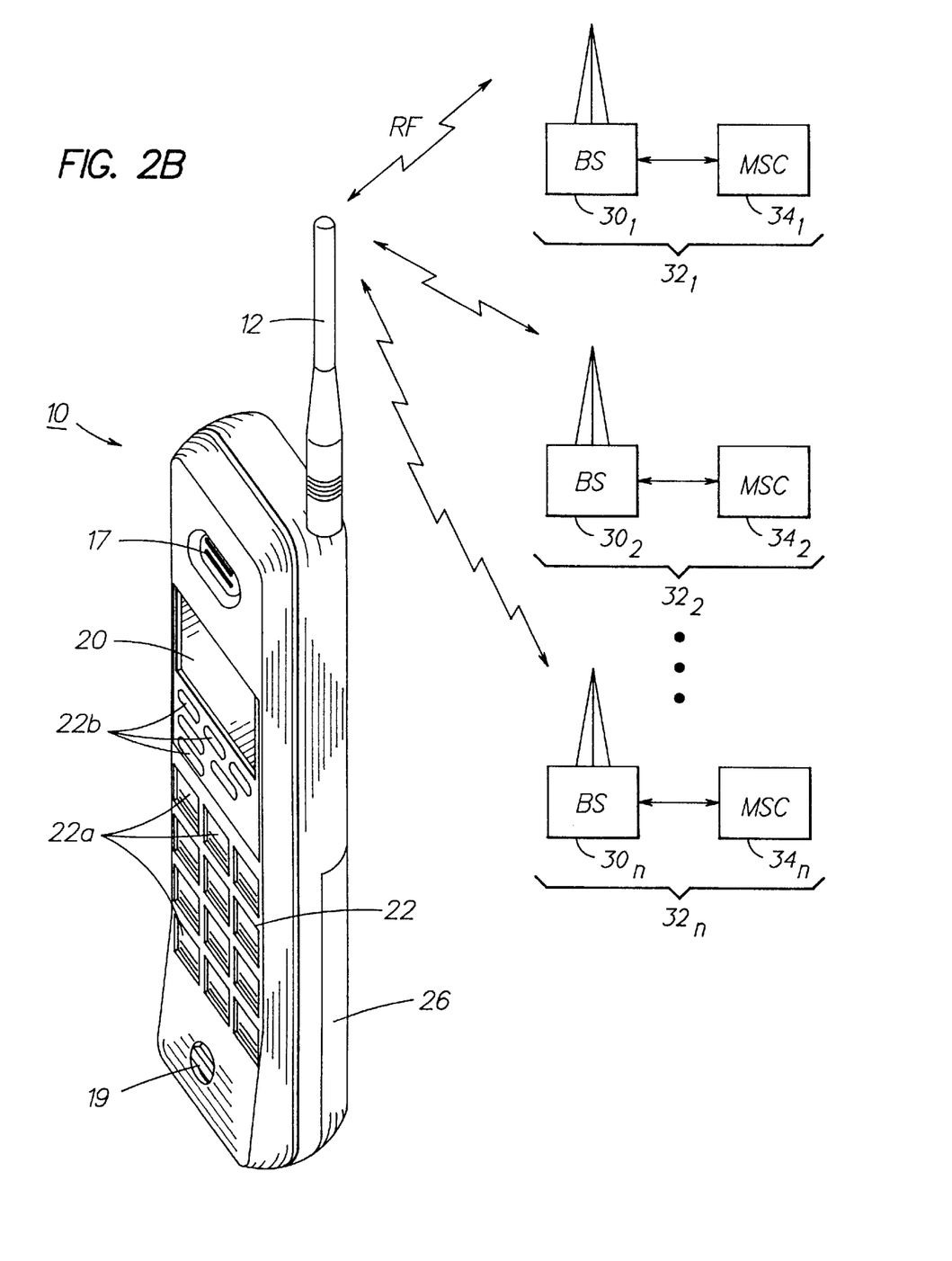
FIG. 2B is an elevational view of the mobile station shown in FIG. 2A, and which further illustrates a plurality of cellular communication networks to which the mobile station can be bidirectionally coupled through wireless RF links.

Reference is made to FIGS. 2A and 2B for illustrating a mobile terminal or station 10, in particular a cellular radiotelephone, that is suitable for practicing this invention. The mobile terminal 10 includes an antenna 12 for transmitting signals to and for receiving signals from one of a plurality of base sites or base stations $30_1$–$30_n$. Each base station 30 is a part of an associated cellular system or network $32_1$ to $32_n$, each of which may include or be connected to a mobile switching center (MSC) 34. The MSC 34 is capable of routing messages to and from the user terminal 10 when the user terminal is registered with the network. Each of the networks is associated with a particular type of network provider or operator, and will generally be public or non-public systems or networks, as was described above. By example, one of the base stations 30 may be residential base station providing service within the user's home, while another one of the base stations 30 may be a public base station providing service over a large geographical area. For this latter case a plurality of the base stations 30 are typically provided, each having a coverage area that overlaps a coverage area of at least one other base station.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a digital control channel (DCCH), and to support Test Registrations and the identification of PSIDs and RSIDs. A presently preferred air interface standard is that specified by IS-136.1, Rev. 0, May 17, 1995, although the teaching of this invention is not limited to only this one particular standard.

The Test Registration capability of IS-136 is described in Section 6.3.14 (Non-Public System Selection). It is noted that in this section it is recommended that the mobile station 10 be capable of dynamically ranking Network Types so that it may attempt registration based on subscriber defined preference order. The system response to the Test Registration is specified in Section 6.4.3.21. Fields in this response message include the Alphanumeric System ID and the Alphanumeric PSID/RSID List.

A user interface includes a conventional speaker 17, a conventional microphone 19, a display 20, and a user input device, typically a keypad 22, all of which are coupled to the controller 18. The keypad 22 includes the conventional numeric (0–9) and related keys (#, *) 22a, and also other keys 22b used for operating the mobile terminal 10. These other keys 22b include, by example, a SEND key, various menu scrolling and soft keys, and a PWR key.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 also stores data, including user messages, that are received from the cellular network 32 prior to the display of the messages to the user. The mobile terminal 10 also includes a battery 26 for powering the various circuits that are required to operate the terminal.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating in accordance with a frequency modulated (FM), frequency division multiple access (FDMA) transmission and reception standard, such as one known as EIA/TIA-553 (AMPS). The terminal may also be capable of operating with any of a number of other analog or digital standards, such as GSM, EIA/TIA 627 (DAMPS), IS-136 (DAMPS), and IS-95 (CDMA). Narrowband AMPS (NAMPS), as well as TACS, mobile terminals may also benefit from the teaching of this invention. Also, terminals operating in accordance with various DCS, TDMA and CDMA 1900 MHz standards are within the scope of this invention, as are dual mode (e.g., 800 MHz/1900 MHz) terminals. In general, the teaching of this invention applies to any radiotelephone terminal that is capable of receiving messages from a system, that includes a display for displaying messages and a menu of mobile terminal functions to a user, and that furthermore includes a user input device, such as a keypad, with which the user can generate messages and also interact with the displayed menu to select various mobile terminal functions. It should thus be clear that the teaching of this invention is not to be construed to be limited to any one particular type of mobile terminal or air interface standard.

In general, the operating program in the memory 24 includes routines to present messages and message-related functions to the user on the display 20, typically as various menu items. The memory 24 also includes routines for implementing the method described below in relation to FIGS. 3A through 23D.

Reference is now made to FIGS. 3A through 23D for illustrating various displays presented on the display 20 of FIGS. 2A and 2B; these drawing figures being useful in explaining the various methods in accordance with this invention. Although these methods will be described in the context of one existing interim cellular digital standard (i.e., IS-136), the teaching of this invention is not limited for use only with this one particular interim standard.

It is first noted that in FIGS. 3A through 23D the icon shown on the left of the display is a received signal strength indicator, and the icon shown on the right of the display is a battery level indicator. Neither of these icons forms a part of the teaching of this invention. The number shown in the upper right portion of the display indicates the level of the display (i.e., the menu number). The symbol ▼ above a display indicates that a down arrow menu scrolling key is depressed to move a display cursor down by one menu item.

Since there may be more than one system available when the mobile station 10 is used, the mobile station 10 must be able to select a system to register to. There are two system select modes available, mainly AUTOMATIC MODE and TEMPORARY MANUAL MODE, both of which are explained in detail below. Once the user has selected a system manually, the selection remains in effect until one of the following events occurs: the signal strength is too low; a call ends; the mobile station 10 is powered off and then on; the user cancels the manual system selection by selecting the AUTOMATIC NETWORK SELECTION menu; the user selects another system using the TEMPORARY NETWORK SELECTION mode; or the active NAM is changed. In all cases mentioned above, the automatic mode is selected as a default mode of operation.

In the automatic mode the mobile station 10 automatically selects one of the available systems. If coverage is lost, the automatic selection procedure is restarted without requiring any user action. A system is selected primarily using the priorities defined as to the different network types. If there are several systems with the same priority available, then one of thethe received sigcted according to the received signal strength. That is, the system having the highest received signal strength is selected.

The priority order of the different network types as default are as follows (highest priority first): residential systems; private systems; and public systems. The priority order of the different public systems depends on the PUBLIC NETWORKS menu selection, as described below with regard to FIGS. 19A through 19F.

In the temporary manual mode the user can choose any of the available and allowed non-public or public systems to use. It should be noted that even those networks that are barred by the PRIVATE NETWORKS menu item are allowed. When registered to a manually selected system and the mobile station 10 loses contact to the selected system, the mobile station 10 changes to the automatic selection mode automatically, i.e., it selects automatically the highest priority system of the available systems.

Figure 3A:
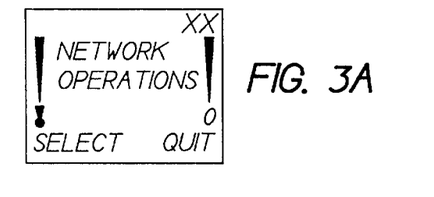

The system selection main menu screen 20a is shown in FIG. 3A, and is referred to herein as Network Operations. The Network Operations menu has three submenus (designated 1–3), as shown in FIGS. 3B–3D.

Figure 3B:
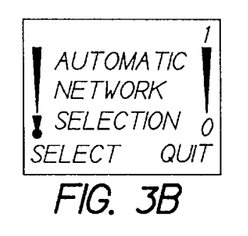
Figure 3C:
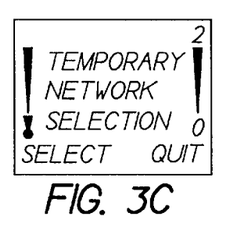
Figure 3D:
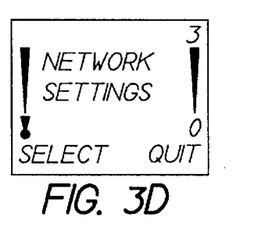

With regard to the Automatic Network Selection menu of FIG. 3B, if the user has made a temporary system selection and desires to return to automatic selection (using priority lists), the user can select the AUTOMATIC NETWORK SELECTION option. If this option is selected the mobile station 10 performs the automatic selection procedure as described above and exits the menu. This mode is used to exit from the manual network selection mode. The return to automatic selection is also performed when the mobile station 10 is powered on, service is lost, or a call ends, as described above.

Figure 4A:
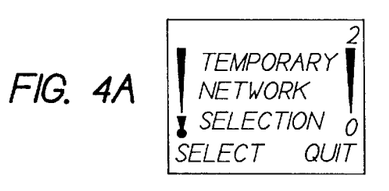
Figure 4B:
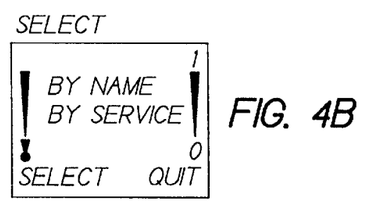
Figure 5A:
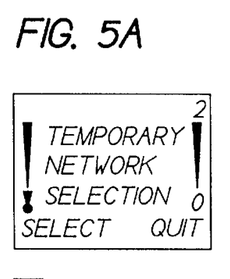
Figure 5B:
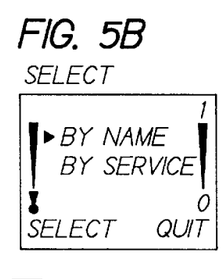
Figure 5C:
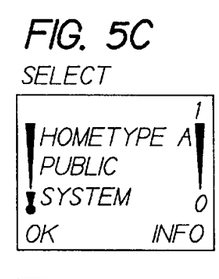
Figure 5D:
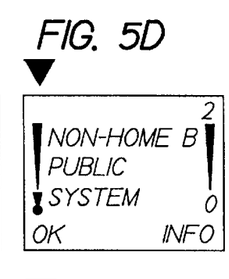
Figure 14A:
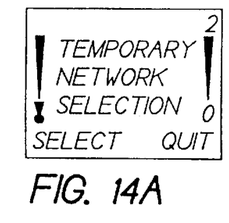
Figure 14B:
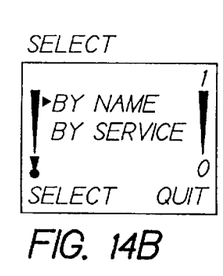

There are two choices in the Temporary Network Selection menu (FIG. 3C), which is shown also in FIGS. 4A, 5A, and 14A. As shown in FIG. 4B, these two choices are "By Name" and "By Service".

Figure 5E:
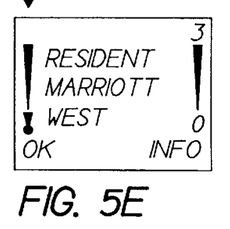
Figure 5F:
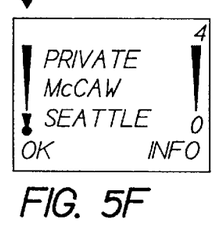
Figure 5G:
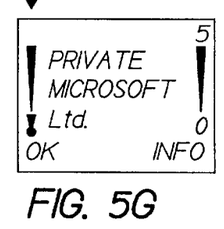

If the user selects the By Name option (FIG. 5B), and referring to FIGS. 5C–5H, the mobile station 10 at first searches all available non-public systems from an internally maintained NAM list of neighboring systems. Next, and in addition to the available public systems, a list of available non-public systems is presented to the user. Only those systems are shown that are available without further network scanning. The list order is as follows: home-type public systems; non-home type public systems; non-public systems that are contained in the NAM list; and other systems, all of which are displayed in priority order. In the example shown in FIGS. 5C–5H, the user's home system is assumed to be System A. If it were instead System B, the display text is changed accordingly. It should be noted that these general public system texts are used only if there is no Alpha Tag for the SID available (either from the network or from NAM programming fields). It should also be noted that FIGS. 5E–5F depict several residential and private systems that do have available alpha tags.

Figure 6A:
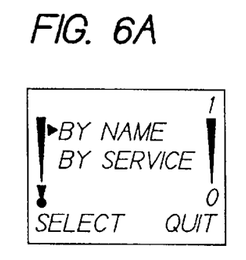
Figure 6B:
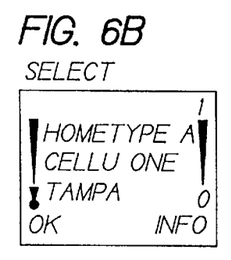
Figure 6C:
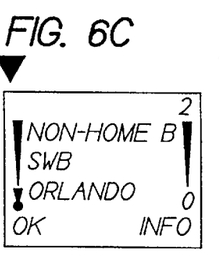
Figure 6D:
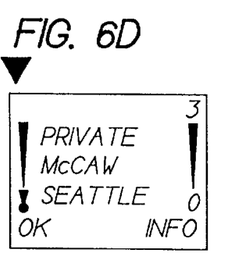

If there is an Alpha Tag available for a public SID, it is displayed instead of the generic public system text, as is illustrated in FIGS. 6B and 6C.

Figure 7A:
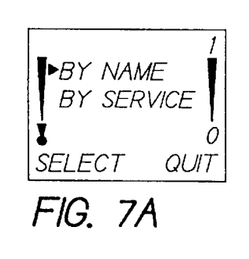
Figure 7B:
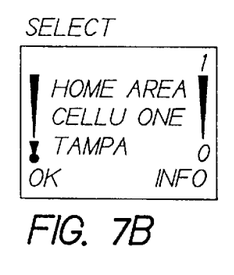
Figure 7C:
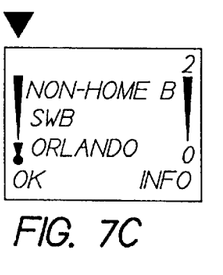
Figure 7D:
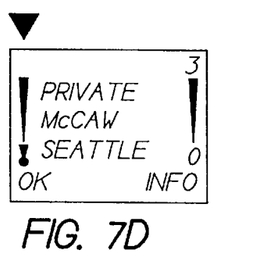

If the system is the user's home system, it may be displayed so as to have a different header text, as shown in FIG. 7B.

Figure 5H:
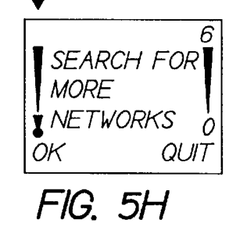
Figure 8A:
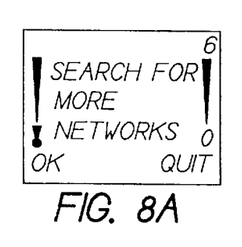
Figure 8B:
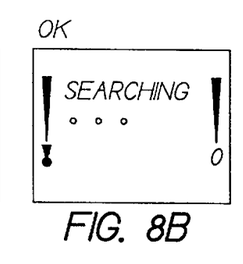
Figure 8C:
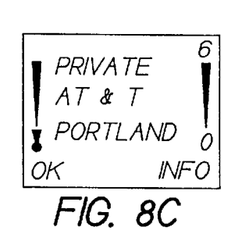

The last item in the network names list is Search for More Networks (FIGS. 5H and 8A). By selecting this item the mobile station 10 is caused to search for other networks (i.e., networks not already in the list) and to display these additional networks (if any are found) one by one. While searching the message shown in FIG. 8B can be displayed to the user. The mobile station may attempt to Test Register with any located networks and, if successful, then displays any newly located network. An example of this is shown in FIGS. 8A–8C.

Figure 9A:
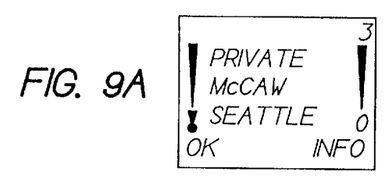
Figure 9B:
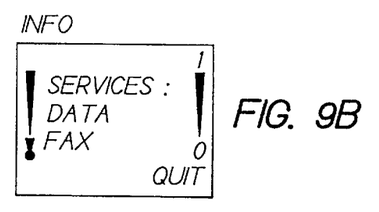
Figure 10:
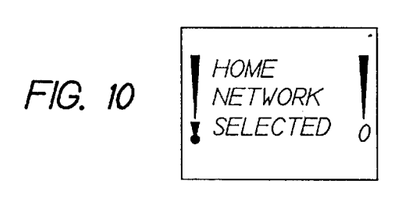
Figure 11A:
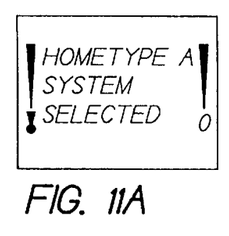
Figure 11B:
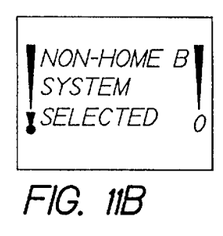
Figure 11C:
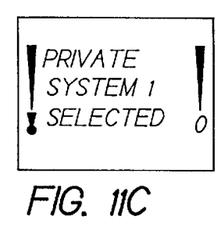
Figure 11D:
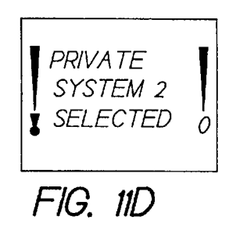

Further in accordance with this invention, and before the user selects a system manually, the user can press an Information (Info) soft key on the keypad 22. The mobile station 10 responds by displaying services available in the selected network, as depicted in FIGS. 9A and 9B. In this example the selected network has both Data and Facsimile services available. It is noted in this regard that Section 6.4.1.1.2.4 of IS-136.1 currently specifies a Service Menu as one type of F-BCCH (Fast Broadcast Control Channel) message. By receiving this or a similar message from a particular network the mobile station 10 can become aware of the services provided by the network.

After the user has manually selected a system, the mobile station 10 attempts to register to that system. If the registration is successful, the mobile station 10 displays the selected system, exits the Network Operations menu (FIG. 3A), and returns to an idle state. If the selected system is the user's home system, it is indicated with the text shown in FIG. 10, as opposed to the system name.

If the selected system is not the home system, and the Alpha Tag of the SID is not available, one of the exemplary messages shown in FIGS. 11A–11D are displayed instead of the system name.

Figure 12A:
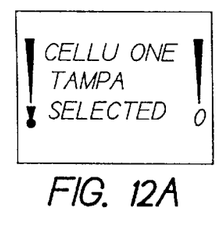
Figure 12B:
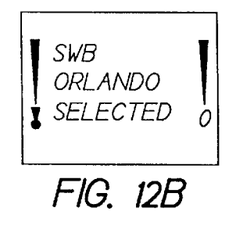
Figure 12C:
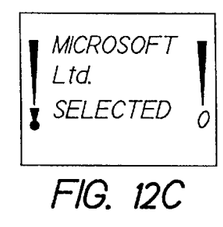

If the selected system is not the home system, and the system's name (SID's alpha tag from network or from NAM programming fields) is available, it is used as shown in the examples shown in FIGS. 12A–12C.

Figure 13:
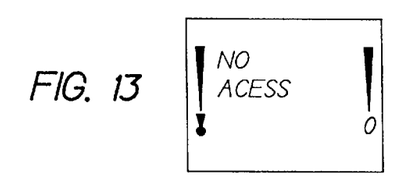

If the registration attempt fails, the mobile station 10 may give an audible signal, displays the message shown in FIG. 13, and goes back to the selection list (e.g., FIGS. 6A or 7A).

Further in accordance with this invention, when selecting a network instead by using the TEMPORARY NETWORK SELECTION menu (FIG. 3C), a user is enabled to select a network by services provided by the networks, as is illustrated in FIGS. 14A–14D and FIGS. 15A–15C.

Figure 14C:
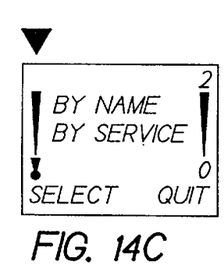

By example, in FIG. 14C the user selects the By Service option. In response, the mobile station 10 displays a list of services available from networks already in the unified list of networks. In the example shown in FIG. 14D, the services Data and Short Message Service (SMS) are displayed. By selecting Data, the user is presented with the displays shown in FIGS. 15A–15C.

Figure 14D:
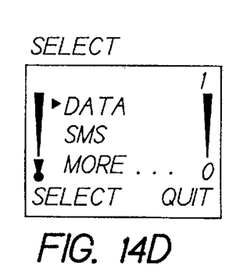
Figure 15A:
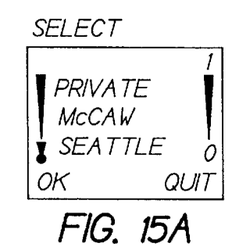
Figure 15B:
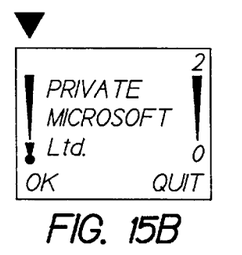
Figure 15C:
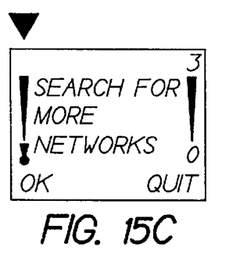
Figure 16A:
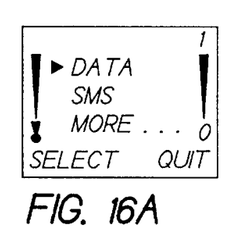
Figure 16B:
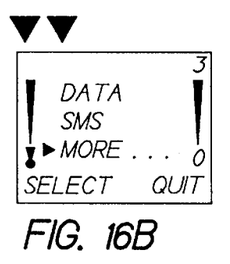
Figure 16C:
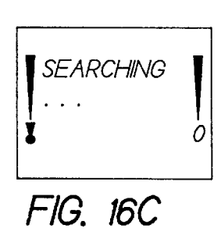
Figure 16D:
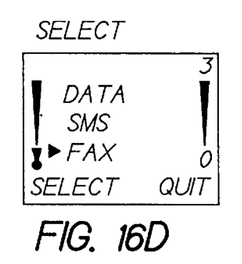

It should be noted that when displaying services, e.g. Data, SMS, etc., there is also a "More . . . " option as shown in FIG. 14D. If the More option is selected by the user (FIG. 16B) the mobile station 10 responds by searching for other networks than those known previously by the mobile station 10 (FIG. 16C). If additional services are found, the newly found service names are added to the list as illustrated in FIG. 16D, where Fax has been added to Data and SMS.

Figure 17A:
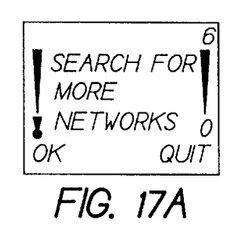
Figure 17B:
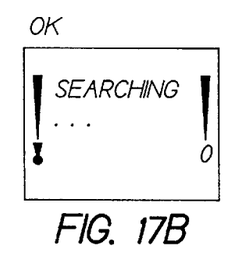
Figure 17C:
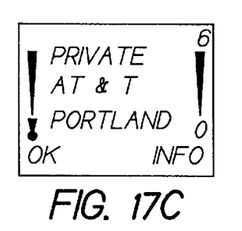
Figure 18A:
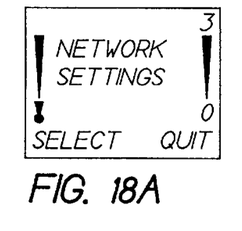
Figure 18B:
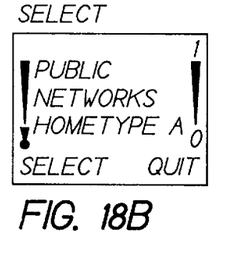
Figure 18C:
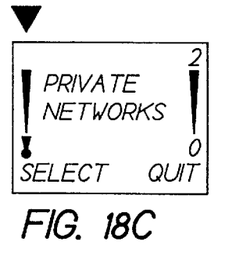
Figure 18D:
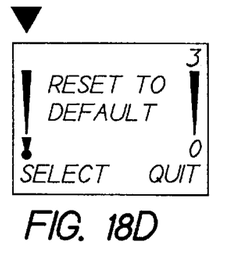
Figure 19A:
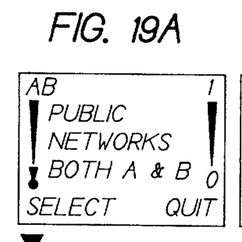
Figure 19B:
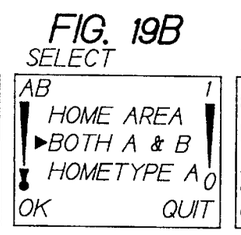
Figure 19C:
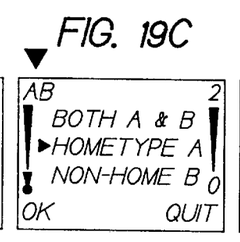
Figure 19D:
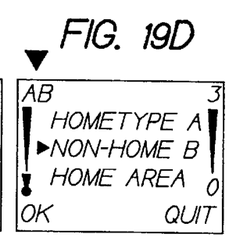
Figure 19E:
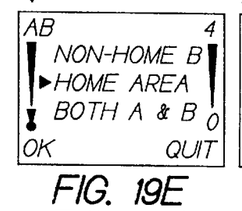
Figure 19F:
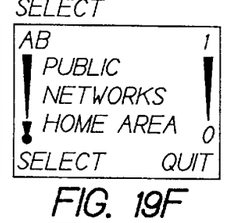
Figure 20A:
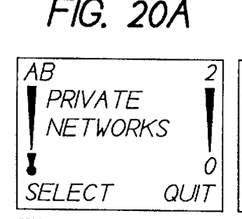
Figure 20B:
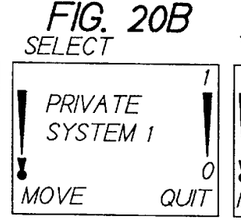
Figure 20C:
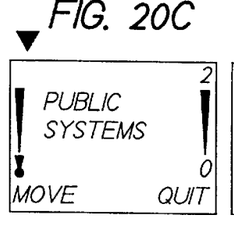
Figure 20D:
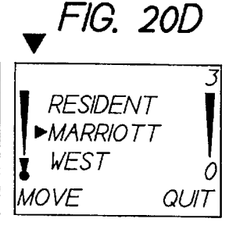
Figure 20E:
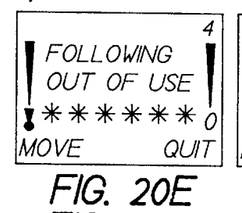
Figure 20F:
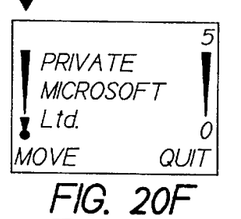

The last item in the network names list (FIG. 15C) is Search for More Networks. By selecting this option (FIG. 17A) the mobile station 10 searches for other networks than those known previously by the mobile station 10 (FIG. 17B) and displays them one by one as shown in FIG. 17C.

In this regard it should be noted that only newly-found networks that support the currently selected service (i.e., Data, SMS, etc.) are displayed to the user.

The Network Settings menu item (FIG. 3D) is selected by the user for setting the priorities of the networks when the mobile station 10 employs uses the Automatic Network Selection option of FIG. 3B. If private networks are available then private network settings are preferred and given a higher priority than public networks. Reference in this regard can be had to FIGS. 18A–18D.

If the user selects the PUBLIC NETWORK SETTINGS option (FIG. 18B), the mobile station 10 presents four choices of public system priority selections from which to select. These are as follows.

Both A & B (FIG. 19B): In this mode the mobile station 10 first tries to use its home system. If it is not available it then tries to use the home-type of system. If the home-type of system is not available, a mobile station 10 tries to use the non-home type of system. The home system is the system associated with the currently selected NAM, and can be either an A-type or a B-type of system. A home-type of system is the same type as the home system, but in a different geographic area. For example, if the home system is B-type, then all B-type systems are home-type networks or systems.

Home-type A (FIG. 19C): If this mode is selected the mobile station 10 can only use the same type of system as the home system. The mobile station 10 will first try to use the home system, but if it is not available it will attempt to use an available home-type of system.

Non-home B (FIG. 19D): If this mode is selected the mobile station 10 can only use the non-home type of system (home area).

Home area (FIG. 19E): If this mode is selected the mobile station 10 can only use the home system (home area).

The user selects one of these options from the menus shown in FIGS. 19A–19E. The mobile station 10 then makes the automatic network selection (FIG. 3B) according to the defined priorities. The selected public system value is stored within a non-volatile portion of memory 24. When power is turned on it is restored and automatic selection is made according to the previously selected priority. The current value is also shown when the user selects this menu option, as is indicated by the change in selected public network between FIGS. 19A and 19F, assuming that the Home Area was selected in FIG. 19E.

It should be noted that if any non-public systems are available these may be selected first, as described below. It should also be noted that the Home-type A may be a default (factory) value. In the example shown in FIGS. 19A to 19F the user's home system is assumed to be A. If it were instead B, the display text is changed accordingly, e.g. Home-type B in FIGS. 19B and 19C.

The Private Networks menu item (FIG. 18C) enables a user to set the priorities of all networks that are selected automatically. The higher the network is located in the list, the higher is its priority. The priority list may be displayed as in the example illustrated in FIGS. 20B to 20F, it being assumed that the Private Networks item is selected in FIG. 20A. With regard to FIG. 20E, all networks below the Out of Use indicator (****) are not scanned and are not selected when the mobile station 10 uses the automatic network selection method, i.e., all networks listed below the Out of Use indicator are barred from use. The only exception is that a barred network can be used if making an emergency call (e.g., 911), only so long as no allowed network can be reached first.

Figure 21A:
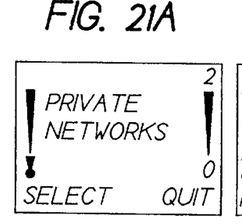
Figure 21B:
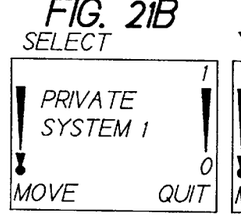
Figure 21C:
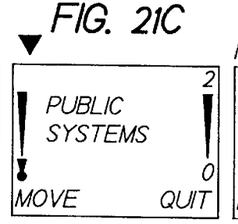
Figure 21D:
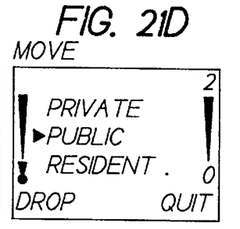
Figure 21E:
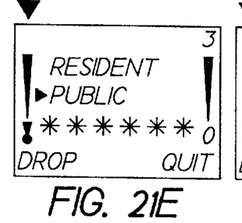
Figure 21F:
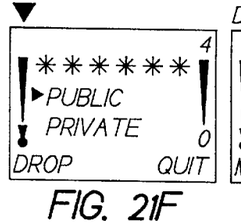
Figure 21G:
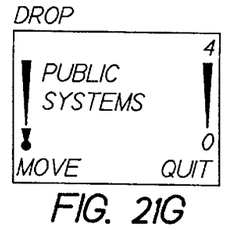
Figure 22A:
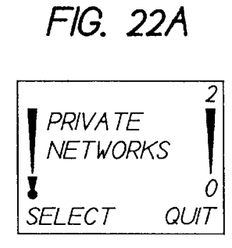
Figure 22B:
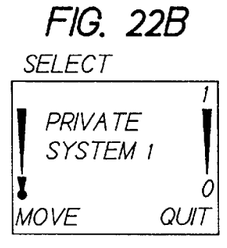
Figure 22C:
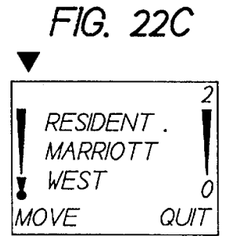
Figure 22D:
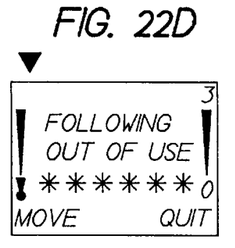

The priority of the networks may be changed by the interaction shown in FIGS. 21A–21G. After this operation the displayed list looks as it is shown in FIGS. 22A–22F. That is, the Public Systems selection (FIG. 21C) has been moved below the Out of Use indicator (FIG. 22E), and the allowed networks are now, in priority order, the Private System 1 (FIG. 22B) and a Residential System (FIG. 22C).

Figure 22E:
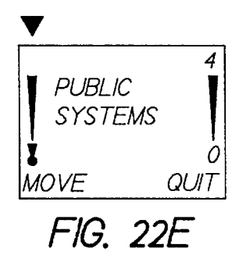
Figure 22F:
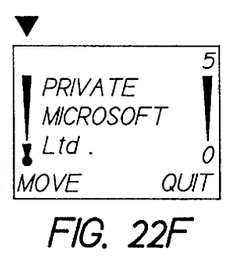

The re-prioritization of the networks is preferably accomplished in a "drag and drop" manner using the mobile station's display 20 and keypad 22. In greater detail, it is first assumed that the menu of FIG. 21A is displayed to the user. In response to depressing the Select key the mobile station 10 displays the menu item of FIG. 21B, that is, the highest priority network. In response to the user depressing the down arrow key ▼ the menu scrolls to the second menu item of FIG. 21C, i.e., the network having the second highest priority. It is noted that when selecting the Private Networks menu the Select soft key indicator in the bottom left corner of the display changes from 'Select' to 'Move'. As such, and in response to the user depressing the Move soft key when the menu of FIG. 21C is displayed, the display indicates (FIG. 21D) that the user desires to move the public network that is located between the private network (FIG. 20B) and the residential network (FIG. 20D) (the up arrow moves up). The Move soft key indicator also changes to "Drop". After depressing the down arrow key ▼ the menu scrolls to show the selected public network located after (i.e., lower in priority than) the residential network (FIG. 22E). After depressing the down arrow key ▼ again the menu scrolls to show the selected public network located after the Out of Use indicator, along with the already barred private network, and thus is also barred from use (FIG. 22F). Depressing the Drop soft key at this time fixes the public network at this position in the priority list (FIG. 22G).

If the user selects the Reset to Default menu item (FIG. 18D) both public network settings and private network settings are set to default values. Suitable default values are, for the public network settings, Home-type A, and for the private network settings, all residential networks first, then all private networks, and then the public systems according to the public network settings. No networks are barred by the mobile station 10 as a result of selecting Reset to Default menu item. That is, the Out of Use indicator is positioned after the last network in the unified priority list.

Figure 23A:
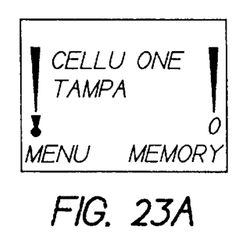
Figure 23B:
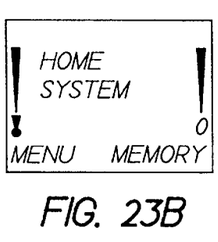
Figure 23C:
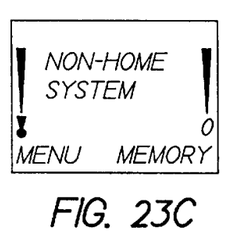
Figure 23D:
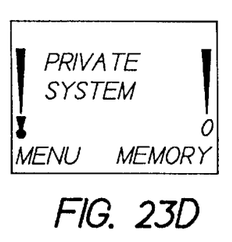

The mobile station 10 indicates the selected network's identification (SID) when the mobile station 10 is not in the call mode. The Alpha Tag of the SID/PSID/RSID, if available, is always used, and not the numeric value of the SID. If there is no Alpha Tag defined, the mobile station 10 instead displays the default Alpha Tag. By example, FIG. 23A shows the case of a public system with a defined Alpha Tag, FIG. 23B shows a home system without a defined Alpha Tag, FIG. 23C shows any other public system without a defined Alpha Tag, and FIG. 23D shows any non-public system without a defined Alpha Tag.

It should be noted that, in addition to the system soft indicator, the mobile station's conventional roaming/fixed indicator can be used to indicate whether the servicing system is the user's home system, home-type of system, or non-home type of system.

Figure 24:
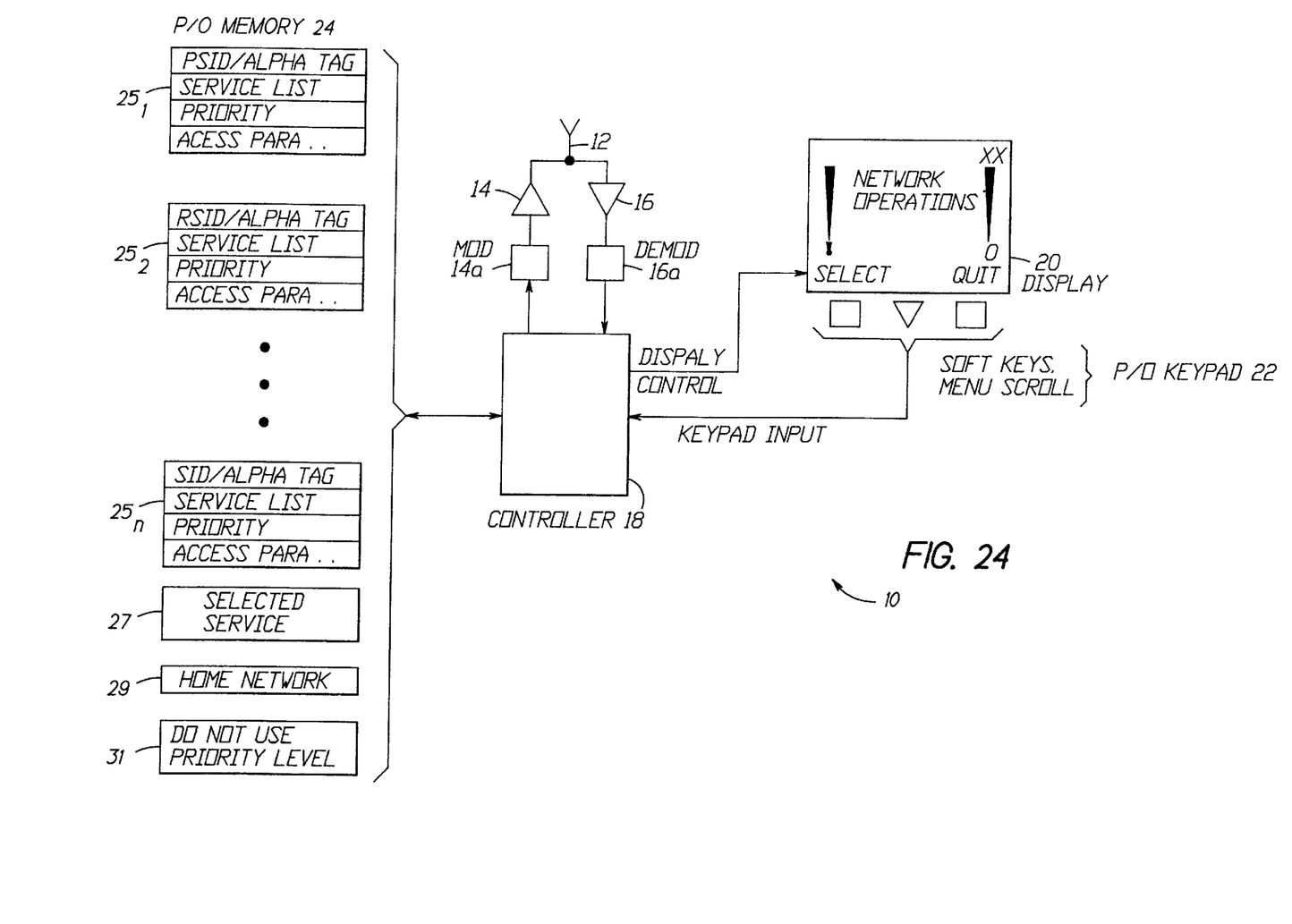
FIG. 24 is further block diagram of the mobile station that is useful in describing the operation of the mobile station as reflected in the various displays shown in FIGS. 3A to 23D.

Reference is now made to FIG. 24 for showing in greater detail a portion of the mobile station 10 of FIGS. 2A and 2B. The memory 24 is shown to include a plurality of data blocks $25_1$, $25_2$, ..., $25_n$, each of which stores information concerning one network. Each NAM supported by the mobile station 10 may have an associated set of data blocks. Each data block 25 stores at least the network ID (e.g., PSID, RSID or SID), depending on the network type, the Alpha Tag if available (or a default Alpha Tag if not available), the network's service list (if available), the network's current priority, the network's access parameters, and any other network-related information that is necessary or useful when operating with the network, such as the System Operator Code (SOC) and the Mobile Country Code (MCC). The data blocks 25 may be initially programmed when the NAM is established, or may be programmed as the result of test registrations performed by the mobile station 10 as described above when searching for new networks. The priority field can store a priority number and/or pointers to other data blocks in a linked list fashion. By example, a network having a third highest priority may have a backwards pointer to the data block storing the second highest priority network and a forward pointer to the data block storing the fourth highest priority network. In this case the reassignment of priorities among networks, such as was described in relation to FIGS. 21A through 21G, can be accomplished by revising the forward and backward pointers of the linked list. In any event, the data blocks 25 are managed so as to provide a unified list of prioritized networks and optionally network services to a user of the mobile station 10.

The memory 24 may also store a currently selected service in block 27, which can be used when searching for networks that support a user-specified service. It should be noted, however, that the selected service is needed only when selecting a network by service and, as a result, may not need to be stored in memory 24. The home network is shown stored in block 29, it being realized that this is actually a part of the stored NAM information. The Do Not Use priority level is shown stored in block 31, and is reset to a lowest priority level in response to the user selecting the Reset to Default screen in FIG. 18D. For other cases, such as that illustrated in FIGS. 21A through 21G, the block 31 may store a priority level value that is intermediate the highest and lowest priority level, and any networks having a priority below this value are considered to be barred from use. The block 31 can also be a part of the linked list, and any network block to which it has a forward pointer is considered to be barred. It is also within the scope of the invention to instead use at least one bit within each RSID/PSID/SID structure to indicate if the network is allowed.

The controller 18 manages the information stored in the various blocks 25–31 as described above with respect to FIGS. 3A through 23D, in cooperation with the display 20, the keypad 22, and the mobile station's RF transceiver embodied in blocks 14, 14a, 16, 16a, and the antenna 12.

Although the various menus and menu operations described above in relation to FIGS. 3A through 23D have illustrated several presently preferred methods of this invention, the teaching of this invention is not intended to be limited to only the illustrated menu functions, texts, and interactions. The teaching of this invention is also not intended to be limited for operation with only one particular air interface specification or standard (e.g., IS-136). Furthermore, as cellular systems and their capabilities evolve through time some network types, network features and/or network services may arise that are not presently specified or contemplated. By example, future cellular systems may be capable of offering video services to users. As such, the teaching of this invention as now embodied and described above is not to be construed to be limited to only the described embodiments, but is instead intended to be given a scope commensurate with the scope of the several claims that follow.

That is, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station, comprising the steps of:

storing within the mobile station a single, prioritized list of networks that are accessible from the mobile station, the list of networks being capable of including both public and non-public networks;

displaying the list of networks to a user of the mobile station;

in response to an input from the user, re-prioritizing the list of networks; and in response to a further input from the user, attempting to register the mobile station with the highest priority network, wherein the step of re-prioritizing includes a step of assigning a network to a priority that is less than a threshold priority below which the network is not accessed unless a call to a predetermined number is being made by the user.

2. A method as set forth in claim 1, and in response to a further input from the user, re-prioritizing the list of networks to a default priority.

3. A method as set forth in claim 2, wherein the default priority is all residential networks, followed by all private networks, followed by all public networks.

4. A method as set forth in claim 1, and in response to a further input from the user, displaying an identification of a network to the user and, in response to further input from the user, displaying to the user a list of services that are supported by the displayed network.

5. A method for operating a mobile station, comprising the steps of:

storing within the mobile station a prioritized list of networks that are accessible from the mobile station, the list of networks being capable of including both public and non-public networks;

in response to an input from the user, re-prioritizing the list of networks;

in response to another input from the user, attempting to register the mobile station with the highest priority network, wherein the step of re-prioritizing includes a step of assigning a network to a priority that is less than a threshold priority below which the network is not accessed unless a call to a predetermined number is being made by the user;

in response to further input from the user, displaying a list of services that are supported by at least some networks of the list; and in response to the user selecting one of the services from the list of services, displaying an identification of at least one network that supports the selected service.

6. A method as set forth in claim 5, and in response to a further input from the user, attempting to register the mobile station with the network that supports the selected service.

7. A method as set forth in claim 5, and in response to a further input from the user, operating a transceiver of the mobile station to attempt to locate at least one other network, that is currently not a part of the list of networks, and that supports the selected service; and displaying an identification of at least one located network to the user.

8. A method as set forth in claim 7, and further comprising a step of adding the at least one located network to the list of networks.

9. A method for operating a mobile station, comprising the steps of:
   maintaining within the mobile station a list of networks, the list of networks being capable of including both public and non-public networks;
   in response to an input from the user, displaying a list of services that are supported by at least some networks of the list, the list of services comprising a video service; and
   in response to the user selecting one of the services from the list of services, displaying an identification of at least one network from the list of networks that supports the selected service.

10. A method for operating a mobile station, comprising the steps of:
    storing within the mobile station a prioritized list of networks that are accessible from the mobile station, the list of networks being capable of including both public and non-public networks;
    in response to an input from the user, displaying identifications of networks from the list of networks, the networks being displayed in order from a highest priority to a lowest priority;
    in response to a further input from the user, re-prioritizing the list of networks;
    in response to another input from the user, attempting to register the mobile station with the highest priority network, wherein
    the step of re-prioritizing includes a step of assigning a network to a priority that is less than a threshold priority below which the network is not accessed unless a call to a predetermined number is being made by the user;
    in response to a further input from the user, operating a transceiver of the mobile station to attempt to locate at least one other network, that is currently not a part of the list of networks; and
    displaying an identification of at least one located network to the user.

11. A method as set forth in claim 10, and in response to a further input from the user, attempting to register the mobile station with the at least one located network.

12. A method as set forth in claim 10, and further comprising a step of adding the at least one located network to the list of networks.

13. A method for operating a mobile station, comprising the steps of:
    storing within the mobile station a prioritized list of networks that are accessible from the mobile station, the list of networks being capable of including both public and non-public networks;
    in response to an input from the user, re-prioritizing the list of networks;
    in response to another input from the user, attempting to register the mobile station with the highest priority network, wherein
    the step of re-prioritizing includes a step of assigning a network to a priority that is less than a threshold priority below which the network is not accessed unless a call to a predetermined number is being made by the user;
    in response to a further input from the user, displaying a list of services that are supported by at least some networks of the list;
    in response to another input from the user, operating a transceiver of the mobile station to attempt to locate at least one other network that supports a service that is currently not listed in the list of services; and
    updating and displaying the list of services so as to show the service supported by the located network.

14. A method as set forth in claim 13, and further comprising a step of adding the at least one located network to the list of networks.

15. A mobile station comprising an RF transceiver, a display, and a user input device, said mobile station further comprising:
    a memory for storing a single, prioritized list of networks that are accessible from the mobile station through the RF transceiver, the list of networks being capable of including both public and non-public networks; and
    control means coupled to said memory, said display, said user input device, and said RF transceiver, said control means being responsive to a first input signals from said user input device for displaying the list of networks to a user of the mobile station, said control means being further responsive to second input signals from said user input device for re-prioritizing the list of networks; and being further responsive to third input signals from said user input device for attempting to register the mobile station with the highest priority network; wherein
    said control means is further operable for displaying an indication of a type or types of services provided by at least some of the networks.

16. A mobile station as set forth in claim 15, wherein said control means is responsive to further input signals from said user input device for re-prioritizing the list of networks to a default priority.

17. A mobile station as set forth in claim 16, wherein the default priority is all residential networks, followed by all private networks, followed by all public networks.

18. A mobile station comprising an RF transceiver, a display, and a user input device, said mobile station further comprising:
    a memory for storing a single, prioritized list of networks that are accessible from the mobile station through the RF transceiver, the list of networks being capable of including both public and non-public networks; and
    control means coupled to said memory, said display, said user input device, and said RF transceiver, said control means being responsive to a first input signals from said user input device for displaying the list of networks to a user of the mobile station, said control means being further responsive to second input signals from said user input device for re-prioritizing the list of networks; and being further responsive to third input signals from said user input device for attempting to register the mobile station with the highest priority network, wherein said control means is responsive to further input signals from said user input device for displaying an identification of a network to the user and for displaying a list of services to the user that are supported by the displayed network.

19. A mobile station comprising an RF transceiver, a display, and a user input device, said mobile station further comprising:

a memory for storing a single, prioritized list of networks that are accessible from the mobile station through the RF transceiver, the list of networks being capable of including both public and non-public networks; and control means coupled to said memory, said display, said user input device, and said RF transceiver, said control means being responsive to a first input signals from said user input device for displaying the list of networks to a user of the mobile station, said control means being further responsive to second input signals from said user input device for re-prioritizing the list of networks; and being further responsive to third input signals from said user input device for attempting to register the mobile station with the highest priority network, wherein said control means is responsive to further input signals from said user input device for displaying a list of services that are supported by at least some networks of the list; and in response to the user selecting one of the services from the list of services, for displaying an identification of at least one network that supports the selected service.

20. A mobile station as set forth in claim 19, wherein said control means is responsive to further input signals from said user input device for operating said transceiver to attempt to locate at least one other network, that is currently not a part of the list of networks, and that supports the selected service; and for displaying an identification of at least one located network to the user.

21. A mobile station comprising an RF transceiver, a display, and a user input device, said mobile station further comprising:

a memory for storing a single, prioritized list of networks that are accessible from the mobile station through the RF transceiver, the list of networks being capable of including both public and non-public networks; and control means coupled to said memory, said display, said user input device, and said RF transceiver, said control means being responsive to a first input signals from said user input device for displaying the list of networks to a user of the mobile station, said control means being further responsive to second input signals from said user input device for re-prioritizing the list of networks; and being further responsive to third input signals from said user input device for attempting to register the mobile station with the highest priority network, wherein said control means is responsive to further input signals from said user input device for displaying a list of services that are supported by at least some networks of the list; and in response to an input from the user, for operating said transceiver to attempt to locate at least one other network that supports a service that is currently not listed in the list of services; and for updating and displaying the list of services so as to show the service supported by the located network.

22. A method for operating a mobile station, comprising the steps of:

maintaining within the mobile station a list of networks, the list of networks being capable of including both public and non-public networks;

in response to an input from the user, displaying a list of services that are supported by at least some networks of the list, the list of services comprising at least one of messaging services, data services, and facsimile services; and in response to the user selecting one of the services from the list of services, displaying an identification of at least one network from the list of networks that supports the selected service.

23. A method as set forth in claim 22, and in response to a further input from the user, attempting to register the mobile station with the network that supports the selected service.

24. A method as set forth in claim 22, and in response to a further input from the user, operating a transceiver of the mobile station to attempt to locate at least one other network, that is currently not a part of the list of networks, and that supports the selected service; and displaying an identification of at least one located network to the user.

25. A method as set forth in claim 24, and further comprising a step of adding the at least one located network to the list of networks.

26. A method for operating a mobile station, comprising the steps of:

storing within the mobile station a prioritized list of networks that are accessible from the mobile station, the list of networks being capable of including both public and non-public networks;

displaying the list of networks to a user of the mobile station by displaying text on a display of the mobile station;

in response to an input from the user, re-prioritizing the list of networks; and in response to a further input from the user, attempting to register the mobile station with the highest priority network; wherein the step of re-prioritizing is accomplished using a drag and drop technique by manipulating at least one mobile station keypad key so as to move displayed text on the display of the mobile station.

27. A method as in claim 26, wherein the step of re-prioritizing includes a step of assigning a network to a priority that is less than a threshold priority below which the network is barred from access unless a call to a predetermined number is being made by the user, and if a non-barred network cannot be reached first.

* * * * *